No. 865,182.

A. JOHNSTON.
MANURE SPREADER.
APPLICATION FILED OCT. 1, 1906.

PATENTED SEPT. 3, 1907.

WITNESSES:

INVENTOR.
Andrew Johnston
BY
Ridout & Maybee
ATTORNEYS.

UNITED STATES PATENT OFFICE.

ANDREW JOHNSTON, OF TORONTO, ONTARIO, CANADA, ASSIGNOR TO MASSEY-HARRIS COMPANY, LIMITED, OF TORONTO, CANADA.

MANURE-SPREADER.

No. 865,182.     Specification of Letters Patent.     Patented Sept. 3, 1907.

Application filed October 1, 1906. Serial No. 337,012.

*To all whom it may concern:*

Be it known that I, ANDREW JOHNSTON, of the city of Toronto, in the Province of Ontario, Canada, have invented certain new and useful Improvements in Manure-Spreaders, of which the following is a specification.

This invention relates to improvements in that type of manure spreaders in which a box is mounted on the running gear of a wagon, and is provided at its bottom with a movable conveyer or bed which gradually carries the manure towards the rear of the box, at which end it is disintegrated and distributed by a rotary beater. In spreaders of this class means are provided for imparting a slow rearward movement to the carrier, and for imparting a rapid return movement. In the best class of distributers a vertical movable tail gate or shield is provided which is lowered to prevent the manure packing on the beater when the apparatus is being loaded and is raised while distribution is going on.

My objects are to provide simple, manually controlled, means for raising the tail gate by power derived from the ground wheels, automatic means for locking the tail gate in its raised position, and automatic means for dropping it after the discharge of the load; to arrange the mechanism so that by a single movement of one lever the tail gate mechanism is conditioned to commence the cycle of movements as above described, the cylinder put in gear with the driving means, and the means for imparting the rearward movement to the bed conditioned to operate; to provide means whereby the beater is automatically thrown out of gear as soon as the bed reaches the end of its rearward movement; means whereby the mechanism for imparting the rearward motion to the bed is automatically thrown out of gear at the same time and the mechanism for imparting the forward movement automatically thrown into gear and subsequently automatically thrown out of gear when the bed has returned to its normal position; to provide means for stopping at will the travel of the bed in either direction, and for changing the speed of the rearward drive; and to provide means whereby both the backward and forward drive for the bed is obtained from the main driving shaft through the agency of a single longitudinal intermediate shaft.

With these objects in view my invention consists essentially of the constructions hereinafter more specifically described, and then definitely claimed.

Fig. 18 is a vertical sectional view of Fig. 7 taken through the parts 26, 28 and 29.

In the drawings like letters of reference indicate corresponding parts in the different figures.

It will be seen that in its fundamental features my machine is similar to those commonly employed. It is provided with a box 1 carried by suitable running gear 2, and provided with a movable bed 3, supported on friction rollers 4 and driven by a sprocket wheel 6 on the shaft 8. The bed, it will be seen, is provided with a sufficient number of slats 9 to form a bottom for the box when the bed is in its extreme forward position, the remaining part of the loop being made up by the sprocket chain 5 running on a sprocket wheel 10 fast on the shaft 7. The usual follower 11 is connected to the forward end of the bed; and the latter is also provided with upwardly curved shoes 12 to enable it to run the more readily over the rollers 4.

The raising and lowering of the tail board by power derived from the ground wheels of the apparatus is an important part of my invention, as shown more particularly in Figs. 1, 6, 7, 8 and 9.

13 is the tail board secured to arms 14 pivoted on suitable bearings at each side of the machine. These arms extend past their pivots and are pivotally connected to connecting rods 15, pivotally connected to cranks 16 on the transverse shaft 17, suitably journaled on the frame of the machine. At the right hand side of the machine, as shown particularly in Figs. 4 and 8, this shaft is movable lengthwise of the machine in a slot 18 formed in the bracket 19, secured to the frame of the machine. There will be allowed sufficient looseness in the bearing at the other end of this shaft to permit of this small amount of play.

To the end of the shaft 17, outside the bracket 19, is secured a segment gear 20. This transverse shaft with its segment gear is located in front of the driving shaft 21 of the machine, this driving shaft being suitably journaled and forming the axle of the ground wheels 22, being rigidly connected therewith. On this shaft is secured the gear wheel 23. It is evident that if the gear segment be thrown into mesh with the gear wheel 23 when the machine is in motion the gear segment will rock the shaft 17 and thus elevate the tail board to the position shown in Fig. 4. For the purpose of throwing this gear segment into and out of gear, and for holding the tail board as raised, I provide the following mechanism:—Extended in the opposite direction to the gear segment 20 is a segment 24 with a plain rim, but provided at its lower and rearward corner with a notch 25, or its equivalent.

Pivoted at 26 on the bracket 19 is a lever 27 provided with a lug 28 adapted to engage the rim of the segment 24.

Pivoted at 29 on the bracket 19 is a latch 30, its forward end being adapted to drop in behind the shaft 17 when the latter is at the rearward end of the slot 18. A rod 31 is hooked about the axle and passes through a lug 32 on the latch. A coil spring 36 bears against the outer side of this lug, and against a nut and washer 33 on the end of the rod. Thus a single spring tends to draw the shaft 17 forwardly and to throw the latch downwardly. At the lower side of the segment is formed a lug 34 in the path of the pin 35 formed on or secured to the latch 30. When the parts are in the position shown in Fig. 7 the lug on the segment will lift the latch and allow the spring to draw forward the shaft 17 and draw the gear segment out of gear. At the upper corner of the gear segment is formed a wing 37, inclined somewhat rearwardly, as shown.

Figures 1, 5:
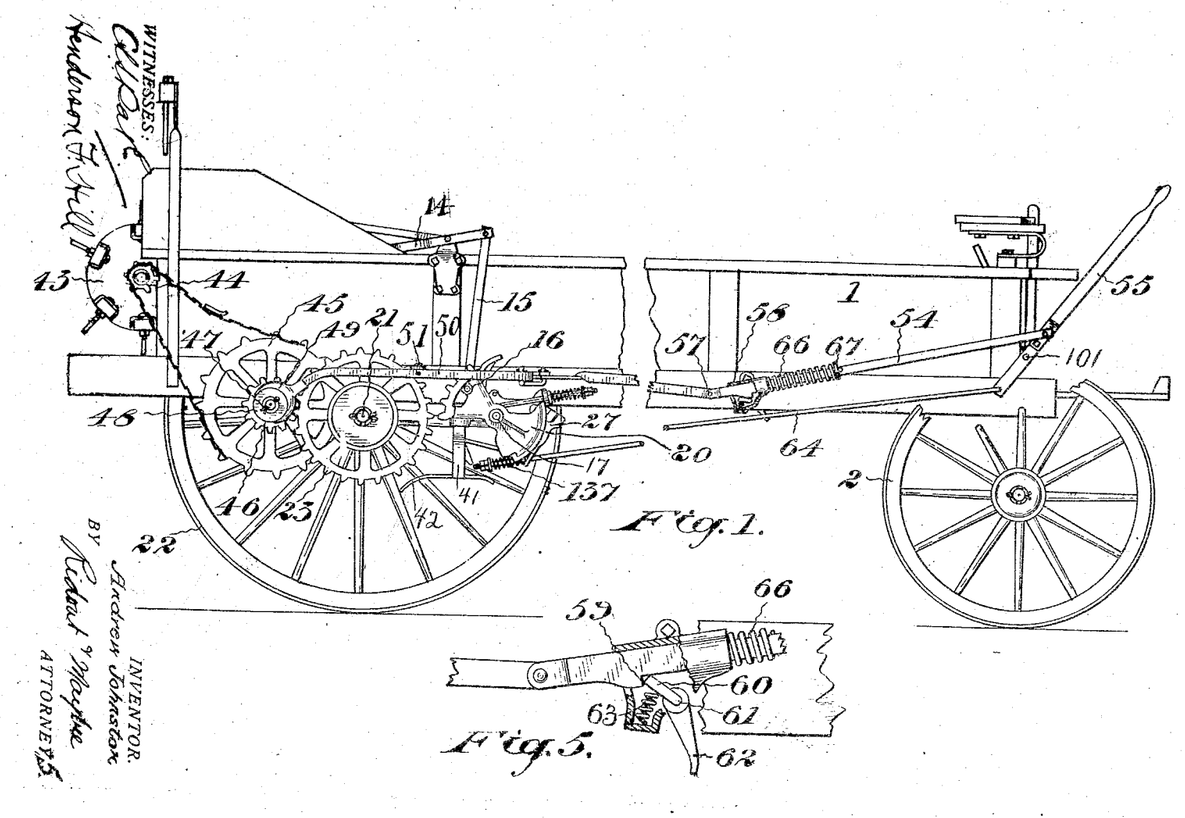
Figure 1 is a side elevation of the right hand side of the machine, parts being broken out.
Fig. 5 is an enlarged sectional elevation of the latch retaining the controlling lever and its rods as moved to start the apparatus.
Figures 2, 6, 7:
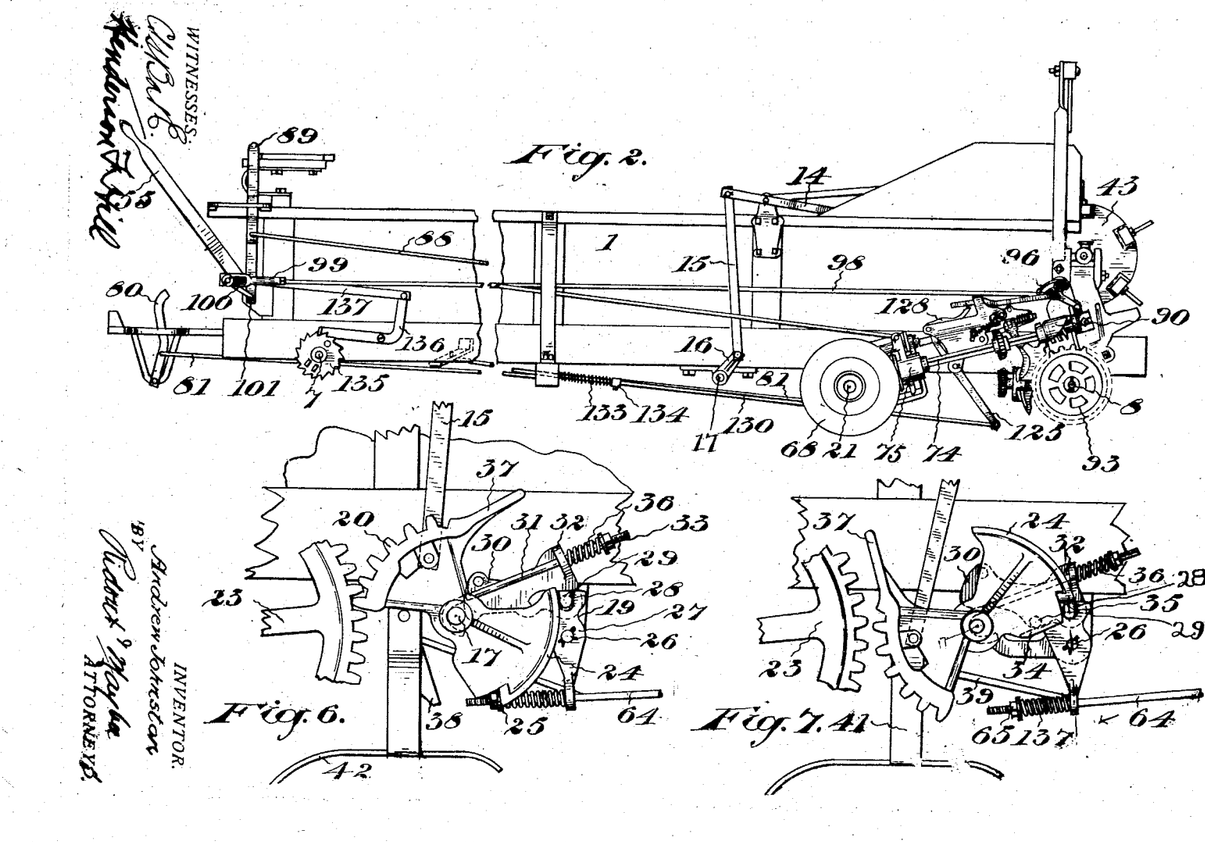
Fig. 2 is a similar view of the other side of the machine.
Fig. 6 is an enlarged elevation of the tail board raising mechanism shown in gear.
Fig. 7 is a similar view showing the same mechanism in the position it assumes when the tail board has been raised and held raised.
Figure 3:
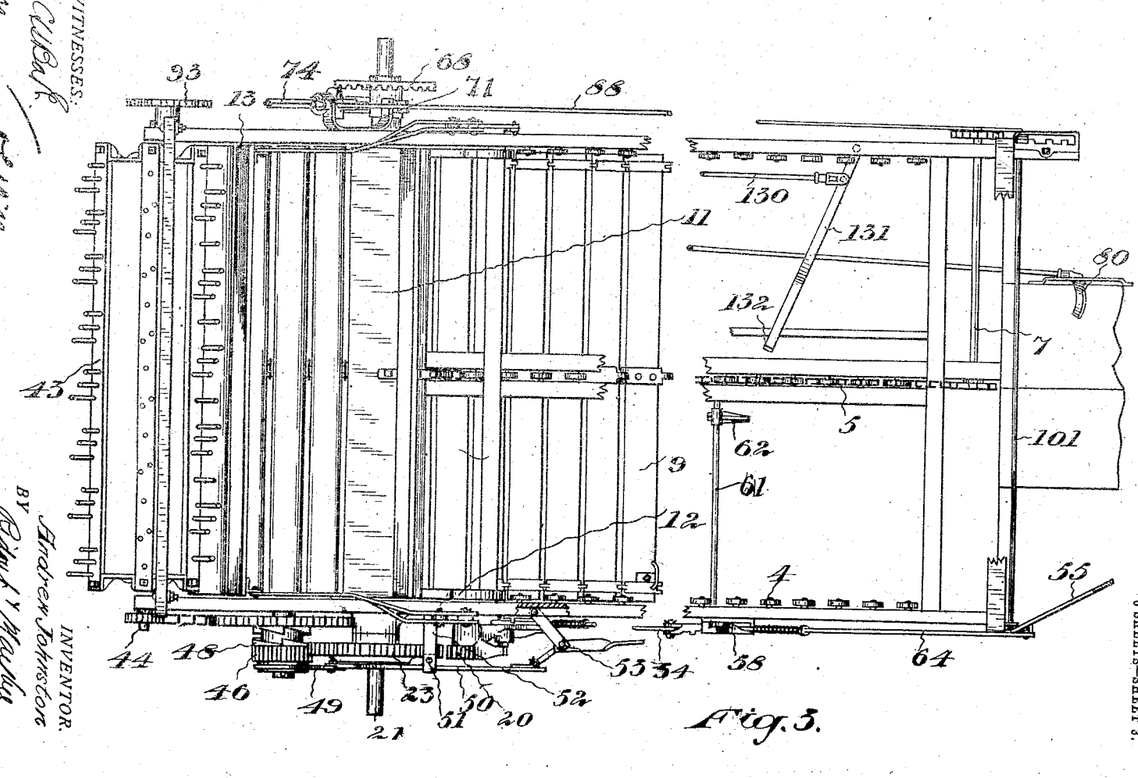
Fig. 3 is a plan view of the machine, partly broken away, and with parts of the bed driving mechanism omitted.
Figures 4, 16, 17:
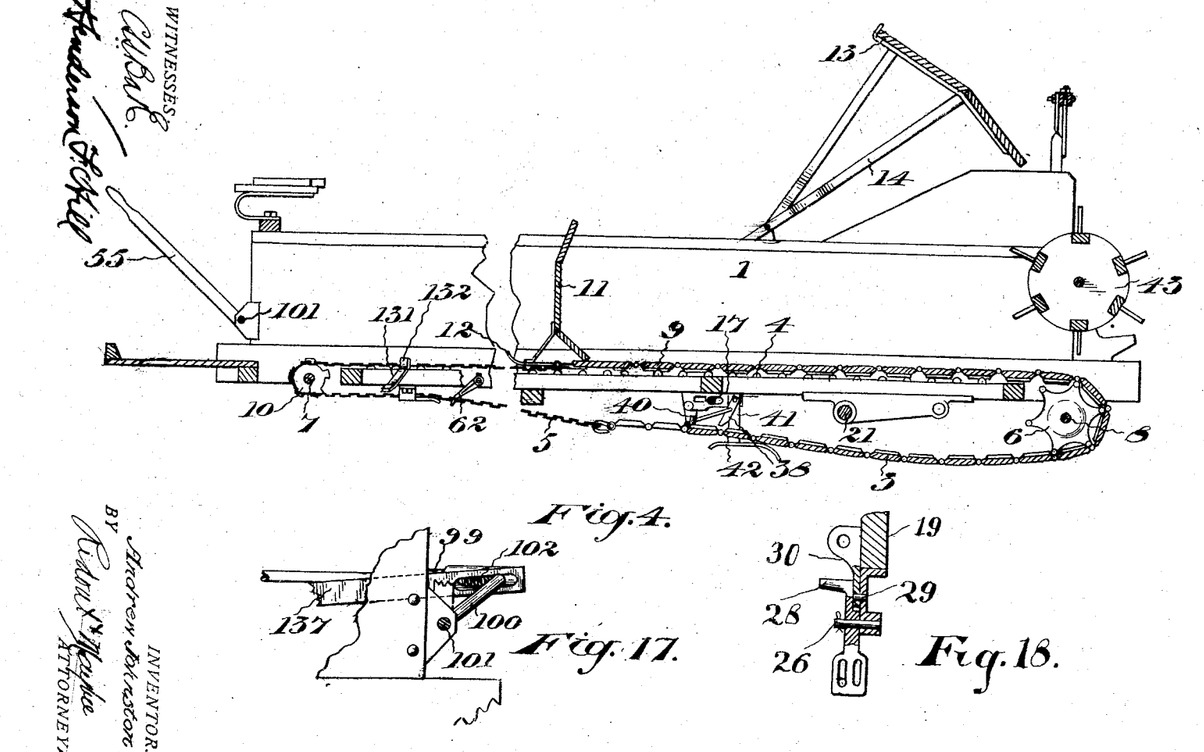
Fig. 4 is a longitudinal section, partly broken away, showing particularly the automatic trips.
Fig. 16 is a detail showing the yielding connection in the means for operating the swinging frame carrying the pinion of the driving gear shown in Figs. 13 to 15.
Fig. 17 is a side elevation, partly in section, of the connection between the controlling mechanism of the bed driving mechanism and the controlling mechanism of the pawl and ratchet of the forward bed carrying shaft.
Figures 8, 15:
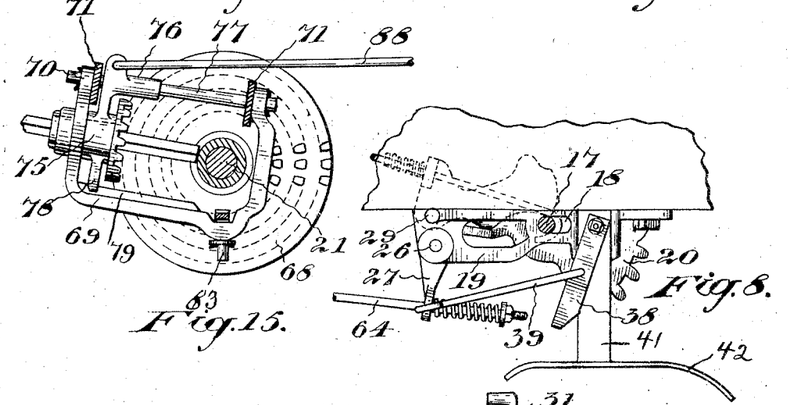
Fig. 8 is a side elevation showing the tail board elevating mechanism from the inside, the tail board trip being also shown.
Fig. 15 is an elevation, partly in section, of the parts shown in Fig. 13 taken from the inner side.
Figure 9:
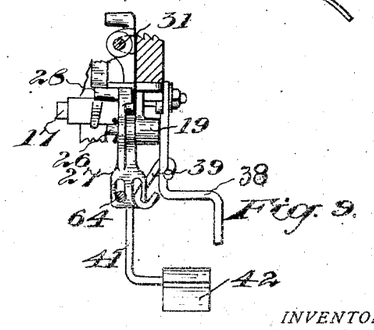
Fig. 9 is an end elevation of parts of the tail board raising mechanism as viewed from the front of the machine.

The operation of these parts is as follows:—Assuming the parts to be in the position shown in Fig. 1, upon rocking the lower end of the lever 27 forwardly the lug thereon bearing on the smooth segment will cause the latter to throw the shaft 17 rearwardly and engage the gear segment with the gear wheel 23 (see Fig. 6). As soon as the shaft 17 reaches the forward end of the slot the latch 30 is drawn down behind it by the action of the spring 36 and the gear segment and gear wheel firmly locked in gear. As the gear wheel rotates the segment is rocked and the tail board thrown up, as shown in Fig. 4. As soon as the tail board is up the lug 28 will drop into the notch 25, thus holding the tail board up, but as soon as the lug has engaged the notch the wing 37 has contacted with the teeth of the gear wheel and the gear segment ceases to rock. So also the lug 34 on the smooth segment engages the pin 35 on the latch and raises the latter, permitting the segment to move forwardly under the combined effect of the contact between the wing and the teeth of the gear wheel 23 and the tension of the spring 36. The tail board is now up and will remain up until disengaged in the following manner;—Pivoted at the inner side of the bracket 19 is a lever 38 having an inwardly extending arm to be engaged by the apron trip 40. To this lever intermediate its ends is pivotally connected a link 39, the other end of which is pivotally connected by means of a long eye or hook to the lower end of the lever 27.

To the inner side of the bed, near its under or rearward end, is secured a trip 40. To the bracket 19 is secured the arm 41 carrying the guide 42 on which the under side of the bed travels. The ends of this guide are preferably bent downwardly, as shown, to prevent the catching of the slats thereon. When the machine is being emptied the trip 40 moves forwardly, and, owing to the loose connections of the link 39, rocks the lever 38 and passes by it. When the trip is traveling in the other direction the trip engages the lever 38 which rocks the lever 27 and disengages its lug from the notch 25. The tail board then immediately drops. This dropping of the tail board is timed to take place after the machine has been emptied, and after the bed has started on its return to its normal position, as hereinafter described.

The machine is provided with the usual rotary beater 43 journaled on the machine at the rearward end of the box. The shaft of this beater is provided with a sprocket wheel 44 driven by a suitable sprocket chain from the sprocket wheel 45. This sprocket wheel is loosely journaled on a stud 47 secured to the frame of the machine. On this stud is a clutch 48 of any ordinary construction, one half of the clutch being formed on the sprocket wheel 45, and the sliding half of the clutch on the gear pinion 46 meshing with the gear wheel 23.

49 is the clutch shifter running in a groove in the movable part of the clutch in the ordinary manner. This shifter is rigidly connected to a spring bar 50 fulcrumed at 51 on any suitable part of the frame of the machine, preferably on bracket 52 extending laterally therefrom. The forward end of the spring bar is connected with the side of the box by a toggle joint lever 53. An operating rod 54 is connected with the central pivot of the toggle joint, and extends forwardly and is pivotally connected to the controlling lever 55, fulcrumed on the rock-shaft or spindle 101 on the end of the box.

For convenience the rod 54 is hinged at 57. Between the hinge and the controlling lever the rod 54 passes through a guide bracket 58 secured to the side of the box. Within this bracket a shoulder 59 is formed at the under side of the rod. This shoulder lies in the path of the cranked end 60 of the spindle 61 journaled transversely of the box, and provided with a downwardly projecting finger 62. A coil spring 63 bears against the cranked end 60 and a suitable part of the guide bracket, thus tending to engage the cranked end with the shoulder 59. As soon as the controlling lever 55 is thrown rearwardly the operating rod 54 is thrown rearwardly and the cranked end 60 engaging the shoulder 59 prevents it resuming its original position until released as hereinafter described. The rearward movement of the operating rod straightens out the toggle joint lever 53 and throws the clutch 48 into gear, thus starting the beater into operation. The bar 50 being of the nature of a spring holds the clutch tight and compensates for any loss of motion in the operating parts.

To the lower end of the controlling lever 55 is pivoted the operating rod 64 which passes through an eye formed in the lower end of the lever 27. A coil spring 137 is placed on the rearward end of the rod which bears against the lever 27 and against a nut and washer 65 screwed on the end of the rod. Thus as the controlling lever 55 is rocked rearward to start the operation of the beater the lever 27 is drawn upon to throw up the tail board, as hereinafter described. The spring 137 not only cushions the pull of the operating rod but also provides the necessary tension to snap the lever 27 into engagement with the notch in the smooth segment, as hereinbefore described. The controlling lever 55 thus serves to start the operation of the beater, and also the raising of the tail board.

The finger 62, it will be noticed, lies in the path of the lower or rearward end slat of the bed, so that by the time the follower on the bed has reached a predetermined extreme rearward position the lower and rearward slat of the bed engages the finger 62. The rocking of this finger withdraws the cranked end 60 from the shoulder 59, and the controlling lever is returned to its normal position by the coil spring 66, which bears against the guide bracket 58 and against a washer 67 secured to the operating rod 54. The return of the lever and the connected operating rods stops the operation of the beater and leaves the tail board operating mechanism in a position to be tripped, as hereinbefore described, to lower the tail board. This controlling lever 55 serves also to start the rearward movement of the bed, as hereinafter described.

The driving and controlling mechanism for the bed is shown particularly in Figs. 2 and 10 to 16.

On the left hand end of the driving shaft 21 is secured a gear disk 68 having its inner face cogged to form driving gears of different diameters.

69 is a frame hinged at 70 on the bracket 71 secured to the side of the box. On this frame is carried the hub 72 of the gear pinion 73 so that the hub may slide longitudinally thereon. The hub 72 has a square hole formed therein through which passes the squared shaft 74, the inner end of the squared shaft bearing against the bearing of the gear disk 68 to prevent endwise motion. Journaled on the hub of the pinion is the shifter 75. This shifter is connected to a sleeve 76 adapted to slide on the hinge rod 77 of the frame 69. A forked finger 78 extends from the lower side of the shifter and engages a guide 79 formed on the lower part of the frame. From this construction it will be seen that the frame may be swung to disengage the pinion 73 from the gear disk, and that when so disengaged the pinion may be slid backward or forward to engage any of the sets of cogs on said disk so that the speed of driving of this squared shaft 74 may be readily varied. The frame is swung, as described, by means of the foot lever 80 fulcrumed on the front of the machine. To this lever is pivoted a connecting rod 81, the other end of which is pivoted on the lever 82 fulcrumed on a pin 83 laterally movable in a short slot 84 formed in the lower part of the frame 69 (see Fig. 16). Within the frame is located a coil spring 85 bearing against the pin 83 and against the outer side of the frame. In the lever 82 is formed a curved slot 86 which engages a pin 87 fast on the adjacent bearing of the driving shaft 21. It is evident that by drawing forward the connecting rod 81 the lever 82 rocking on the pin 83 and bearing with its curved cam slot 86 against the pin 87 will swing the frame 69 away from the gear disk, and by reversing the movement the frame will be thrown towards the gear disk to engage the pinion therewith. The spring 85 permits of a slight play should the teeth of the gear pinion be not in exactly the proper position to drop into mesh with the cogs of the gear disk when the frame is operated to throw the two into gear. The parts just described also afford ready means for stopping the travel of the bed of the machine whenever desired. The shifter 75 is moved by a connecting rod 88 which is pivoted on the sleeve 76 and connected at its other end to the hand lever 89 fulcrumed on the front end of the box convenient to the driver's seat.

I will now describe the specific means employed for giving the bed its forward and rearward movements. The square shaft 74, it will be noted, particularly on reference to Figs. 2, 10 and 11, extends rearwardly and has a bearing in the slide 90 which is suitably shaped to engage the T guide 91 secured to the frame of the machine. The shaft 74 is preferably slightly loose in its bearings to permit of it being swung up and down with the slide without binding.

Carried by the shaft 74 is a worm 92 adapted to engage the worm wheel 93 fast on the shaft 8 carrying the sprocket wheel 6 carrying and driving the bed. The slide 90 is moved by means of the lever 94, which is pivoted on the slide at 95. The lever is provided with a curved cam slot 96 engaging the pin 97 fast on some stationary part. A connecting rod 98 is pivoted on this lever 94, and is provided at its other end, near the front of the box, with a connecting piece 99 slotted to engage a crank pin formed at the end of the crank arm 100, on the left hand end of the spindle 101, which is secured to the controlling lever 55. A coil spring 102 tends normally to throw rearwardly the connecting rod and maintain the forward end of the slot in contact with the crank pin. When the lever is thrown rearwardly, as already described, to raise the tail board and start the beater it simultaneously, through the medium of this crank and the connecting rod 99, throws downward the slide carrying the worm 92. The coil spring 102 serves to take up any lost motion and closely and by spring pressure holds the worm in contact with the worm wheel. The bed now starts to move rearwardly owing to the fact that the shaft 74 is driven from the main driving shaft, as already described.

Figure 10:
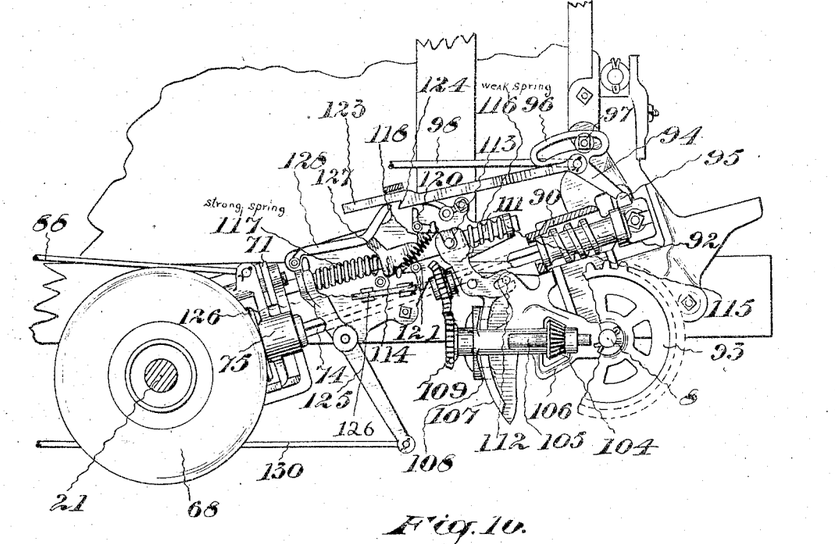
Fig. 10 is a side elevation of the driving mechanism of the bed in gear for the return movement.

Means must be provided to stop the rearward movement of the bed and then return it to its forward position. This is effected by the means I will now describe. On the inner face of the worm wheel 93 is formed a bevel gear 103. With this meshes a bevel pinion 104 secured to a short longitudinal shaft 105 journaled on a frame 106. This frame is journaled on the shaft 8. A guide 107 is provided for this frame, which guide is suitably secured to the frame of the machine. The frame 106 has lugs 108 passing behind this guide, as shown in Fig. 10, to hold the frame and guide in contact without interfering with the vertical swing of the frame. On the outer end of the shaft 105 is secured a bevel gear wheel 109 adapted when the frame is swung upwardly to engage the bevel gear wheel 110 fast on the shaft 74. For the purpose of raising and lowering the frame 106 I provide a lever 111 pivoted on the frame of the machine and forked at its rearward end to engage a pin 112 on the frame 106. The upper end of the lever 111 is forked to engage the pin 113 on the sliding bolt 114. This bolt slides through lugs 115 formed on a casting secured to the frame of the machine. This bolt is somewhat enlarged in the middle forming shoulders which may be engaged respectively by the springs 116 and 117. The rearward spring 117 is of considerable less strength than the spring 116 and bears at its rearward end against the rearward lug 115. A notch 118 is formed in the upper side of the middle of the sliding bolt, and a notch 119 in the lower side, the notches being preferably ratchet shaped, and facing respectively forwardly and rearwardly. Bent pivoted dogs 120 and 121 are pivoted on the supporting casting of the bolt, and are adapted to respectively engage the said notches. A spring 122 is connected to each dog adjacent to its engaging end, tending thus to maintain each dog in its engaging position.

Figures 11, 12:
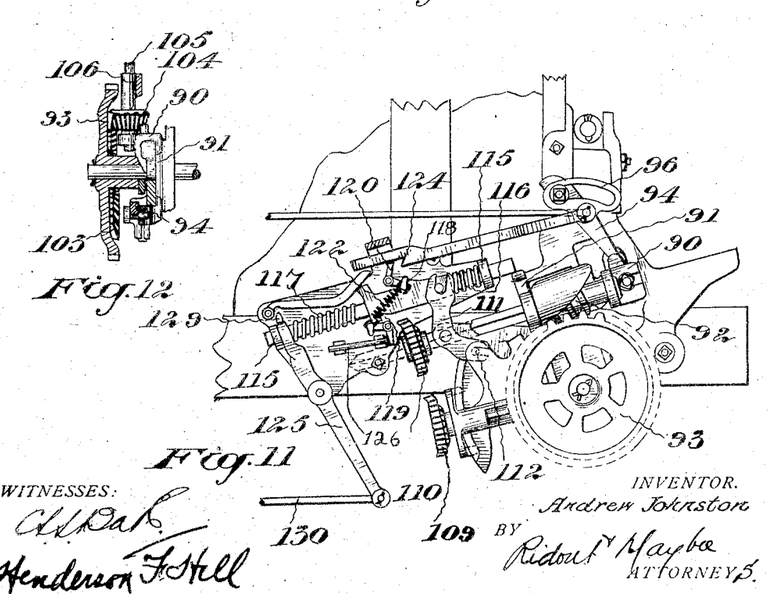
Fig. 11 is a similar view of parts of the same showing the mechanism in gear for the rearward movement.
Fig. 12 is a plan view, partly in section, showing the slide carrying the longitudinal driving shaft, and also the construction of the combined bevel and spur gear on the bed driving shaft.
Figure 13:
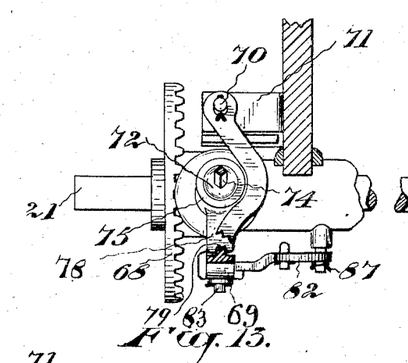
Fig. 13 is a rear elevation, partly in section, of the gear changing mechanism.
Figure 14:
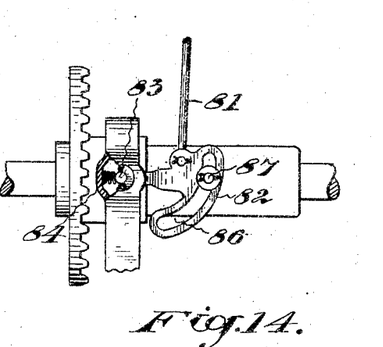
Fig. 14 is a plan view of the underside of parts of the same.
Figure 16:
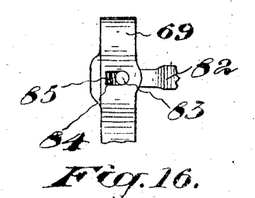

123 is a trip bar pivoted on the lever 94. Near its forward end it is provided with a shoulder 124. When the lever 94 is thrown rearwardly to bring the worm into engagement with the worm wheel the trip bar 123 is carried rearwardly as shown in Fig. 11, and the shoulder is in position to engage the tail of the dog 120. When the parts are in their initial position the bolt is in the rearward position shown in Fig. 11, and the dog 120 is engaged with the notch 118 thereby locking the reversing feed. When, however, the beater is stopped, as hereinbefore described, by the bed engaging the finger 62 the controlling lever 55 assumes its normal forward position. This causes the crank arm 100 on the spindle and the controlling lever to draw upon the connecting rod 98 to lift up the worm gear to the position shown in Fig. 10. As this throws the lever 94 forwardly the trip bar 123 is also moved forwardly and engages the tail of the dog 120, lifting the latter out of engagement with the sliding bolt and permitting the spring 116 to throw the latter rearwardly. The sliding bolt, through the medium of the lever 111 and its connecting parts, raises the bevel gear wheel 109 into mesh with the bevel gear wheel 110, as shown in Fig. 10. It should be mentioned that at the time the dog 120 is tripped the spring 117 is under little or no tension. This spring, it will be seen, lies between the widened part of the bolt and the end of a lever 125 through which the bolt passes. Between this lever and the tail of the dog 121 is a pin 126 sliding in suitable guides adapted to engage the tail of the dog and to be engaged by the lever 125. The lever 125 is pivoted on the supporting casting of the bolt 114, and has its free end extended downwardly. By drawing upon this lever the spring 117 may be powerfully compressed so that as soon at the lever engages the pin 126 and releases the dog 121 the tension of the spring is sufficient to shoot the bolt 114 rearwardly against the tension of the spring 116, thus throwing the bevel gear wheels 109 and 110 out of gear, and stopping the rearward drive of the bed.

It will be noted that a toe 127 extends upwardly from the middle of the bolt 114, and that this toe engages the under side of the bent pivoted arm 128. This toe, as long as the bolt is in the position shown in Fig. 10, holds the arm 128 in such a position that its free end engages the under side of the trip bar 123, and thus prevents the latter from interfering in any way with the action of the dog 120. When the bolt is shot forward as just described, its supporting toe is of course removed and the trip bar would drop and interfere with the working of the dog, but by the time the toe moves away from the arm 128 the end 129 of the lever 125 has moved forward to a position where it will engage the under side of the bent arm and retain the latter in its raised position until the lever itself returns to its ordinary position. The toe 127 also serves by engaging and raising the bent pivoted arm 128 to disengage the trip lever 123 from the dog 120 after the dog has been tripped and the bolt shot back to throw out the direct drive.

The lever 125 is operated by means of a connecting rod 130, the other end of which is pivoted on the horizontal lever 131, fulcrumed at one end to the frame of the machine. This lever has an upwardly turned end 132 lying in the path of the end of the upper part of the traveling bed of the machine. When the bed is traveling forward its end engages this lever and thus gradually moves the lever 125 until by the time the follower 11 has reached the extreme forward position desired the reverse is thrown out of gear, as just described. A coil spring 133 engages a part of the frame of the apparatus through which the rod 130 passes, and also a collar 134 fast on the rod. This spring tends normally to maintain the lever in the position shown in the drawings.

Now it will be seen from the construction described that when reversing motion is in gear, as shown in Fig. 10, it is impossible to throw in the worm which gives the forward drive owing to the locking of the sliding bolt 114 by the dog 121 which locks up the gear 109 and consequently the gear 110, thus preventing the shaft 74, carrying the worm, from being moved downwards, as shown in Fig. 10. So too it will be seen on examination of Fig. 11 that the bevel gears 109 and 110 cannot be thrown into gear without first withdrawing the worm from engagement with the worm wheel, as until the dog 120 is released the parts cannot assume the position shown in Fig. 10, and this release of the dog 120 is effected by the movement of throwing the worm out of gear. I thus insure that there shall be no breakage of the parts due to both the rearward drive and the reverse being put into gear at the same time, either inadvertently or accidentally. As it is desirable that means shall be provided to retain the bed in its normal position when both the rearward and forward drive are out of gear I provide on the shaft 7 a ratchet wheel 135. The dog of this ratchet wheel is formed as a bent lever 136 pivoted on the side of the box. To the upper arm of this lever is pivoted a connecting rod 137, the other end of which is slotted to embrace the crank pin of the crank arm 100. (See Fig. 17). Thus when the bed of the machine is returning to its normal position and the controlling lever is in the forward position shown in Fig. 2 the lever 136 is free to operate as a ratchet. As soon, however, as the controlling lever is moved to start the machine the bent lever is raised out of engagement with the ratchet wheel and nothing then interferes with the free rearward movement of the bed.

Having now described the construction of my machine I will briefly set out its mode of operation.

As the general operation of a machine of this character is well understood I need refer only to those features in its operation which relate particularly to my improvements.

It will be seen that one rearward movement of a single controlling lever causes the raising of the tail board, throws the beater into gear, starts the rearward drive of the bed, and releases the pawl and ratchet device, which normally prevents the rearward movement of the bed. As soon as the tail board is raised it is automatically locked in its raised position by lever 27 and lug 28. As soon as the bed reaches the limit of its rearward motion the rearward drive is automatically thrown out of gear by means of trip 62 and spring 66 and the reverse movement or forward drive thrown into gear. At the same time the controlling lever is caused to assume its normal position and the beater stopped. Shortly after the bed commences its reverse or forward movement the tail board is tripped by parts 38 and 40 and descends to its normal position, the way for this having been prepared by the return of the operating lever and its connected parts to the normal position. As soon as the bed has returned to its normal position the reverse movement is automatically thrown out of gear through the operation of the parts 131, 130, 125 and 117. It also appears that by operating the lever 80 the drive of the bed of the machine may be stopped at any time and the gear changed by lever 89 to give a faster or slower drive.

What I claim as my invention is:—

1. In a manure spreader the combination of a vertically movable tail board; a ground wheel; manually controlled means whereby the rotation of the ground wheel will be caused to raise the tail board; and means for automatically throwing the raising means out of gear as soon as the tail board has been raised to a predetermined height, substantially as described.

2. In a manure spreader the combination of a vertically movable tail board; a ground wheel; manually controlled means whereby the rotation of the ground wheel may be caused to raise the tail board; means for automatically throwing the raising means out of gear as soon as the tail board has been raised to a predetermined height; and releasable means for automatically locking the tail board in its raised position, substantially as described.

3. In a manure spreader the combination of a vertically movable tail board; a ground wheel; manually controlled means whereby the rotation of the ground wheel may be caused to raise the tail board; means for automatically throwing the raising means out of gear as soon as the tail board has been raised to a predetermined height; releasable means for automatically locking the tail board in its raised position; a longitudinally movable bed; means for moving said bed rearwardly and forwardly; and means whereby the bed at a predetermined point in its movement releases the said tail board and permits it to drop, substantially as described.

4. In a manure spreader the combination of a ground wheel; a gear wheel rotating therewith; a gear segment slidably journaled so that it may be moved into or out of gear with the said gear wheel; manually operated means for moving the segment into gear; a vertically movable tail board; means whereby when the machine is in motion and the gear segment is in gear the latter will raise the tail board; automatic means for throwing the segment out of gear as soon as the tail board is raised; and releasable means for automatically locking the tail board in its raised position, substantially as described.

5. In a manure spreader the combination of a ground wheel; a gear wheel rotating therewith; a gear segment slidably journaled so that it may be moved into or out of gear with the said gear wheel; manually operated means for moving the segment into gear; a latch adapted to automatically lock the segment in gear; a vertically movable tail board; means whereby when the machine is in motion and the gear segment is in gear the latter will raise the tail board; automatic means for throwing the segment out of gear as soon as the tail board is raised; means for automatically withdrawing the latch just previous to the moving of the segment out of gear; and releasable means for automatically locking the tail board in its raised position, substantially as described.

6. In a manure spreader the combination of a ground wheel; a gear wheel rotating therewith; a gear segment slidably journaled so that it may be moved into or out of gear with the said gear wheel; a smooth rimmed segment rigid with the gear segment, extending in the opposite direction thereto, and provided at one end with a notch; a pivoted lever adapted to engage the smooth segment to throw the gear segment into gear; a vertically movable tail board; means whereby when the machine is in motion and the gear segment is in gear the latter will raise the tail board, the aforesaid lever being adapted to engage the aforesaid notch to hold the gear segment with the tail board raised; and automatic means for throwing the segment out of gear as soon as the tail board is raised, substantially as described.

7. In a manure spreader the combination of a ground wheel; a gear wheel rotating therewith; a gear segment slidably journaled so that it may be moved into or out of gear with the said gear wheel; a smooth rimmed segment rigid with the gear segment, extending in the opposite direction thereto, and provided at one end with a notch; a pivoted lever adapted to engage the smooth segment to throw the gear segment into gear; a vertically movable tail board; means whereby when the machine is in motion and the gear segment is in gear the latter will raise the tail board, the aforesaid lever being adapted to engage the aforesaid notch to hold the gear segment with the tail board raised; and a wing on the gear segment adapted to engage the gear wheel to throw the segment out of gear as soon as the tail board is raised, substantially as described.

8. In a manure spreader the combination of a ground wheel; a gear wheel rotating therewith; a gear segment slidably journaled so that it may be moved into or out of gear with the said gear wheel; a smooth rimmed segment rigid with the gear segment, extending in the opposite direction thereto, and provided at one end with a notch; a pivoted lever adapted to engage the smooth segment to throw the gear segment into gear; a vertically movable tail board; means whereby when the machine is in motion and the gear segment is in gear the latter will raise the tail board, the aforesaid lever being adapted to engage the aforesaid notch to hold the gear segment with the tail board raised; a wing on the gear segment adapted to engage the gear wheel to throw the segment out of gear as soon as the tail board is raised; and a spring tending to hold the gear segment out of gear, substantially as described.

9. In a manure spreader the combination of a ground wheel; a gear wheel rotating therewith; a gear segment slidably journaled so that it may be moved into or out of catch with the said gear wheel; a smooth rimmed segment rigid with the gear segment, extending in the opposite direction thereto, and provided at one end with a notch; a pivoted part adapted to engage the smooth segment to throw the gear segment into gear; a vertically movable tail board; means whereby when the machine is in motion and the gear segment is in gear the latter will raise the tail board, the aforesaid part being adapted to engage the aforesaid notch to hold the gear segment with the tail board raised; a wing on the gear segment adapted to engage the gear wheel to throw the segment out of gear as soon as the tail board is raised; and a releasable pivoted latch adapted to retain the gear segment in gear, the smooth rimmed segment and the latch being adapted to engage to release the latch just before the gear segment is thrown out of gear, substantially as described.

10. In a manure spreader the combination of a ground wheel; a gear wheel rotating therewith; a gear segment slidably journaled so that it may be moved into or out of gear with the said gear wheel; a smooth rimmed segment rigid with the gear segment, extending in the opposite direction thereto, and provided at one end with a notch; a pivoted lever adapted to engage the smooth segment to throw the gear segment into gear; a vertically movable tail board; means whereby when the machine is in motion and the gear segment is in gear the latter will raise the tail board, the aforesaid lever being adapted to engage the aforesaid notch to hold the gear segment with the tail board raised; a wing on the gear segment adapted to engage the gear wheel to throw the segment out of gear as soon as the tail board is raised; and a releasable pivoted latch adapted to retain the gear segment in gear, the smooth rimmed segment and the latch being adapted to engage to release the latch just before the gear segment is thrown out of gear, a spring engaging both the latch and the pivot of the gear segment tending to draw down the former to its locking position and to draw the segment out of gear, substantially as described.

11. In a manure spreader the combination of a ground wheel; a gear wheel rotating therewith; a gear segment slidably journaled so that it may be moved into or out of gear with the said gear wheel; a smooth rimmed segment rigid with the gear segment, extending in the opposite direction thereto, and provided at one end with a notch; a pivoted lever adapted to engage the smooth segment to throw the gear segment into gear; a vertically movable tail board; means whereby when the machine is in motion and the gear segment is in gear the latter will raise the tail board, the aforesaid lever being adapted to engage the aforesaid notch to hold the gear segment with the tail board raised; automatic means for throwing the segment out of gear as soon as the tail board is raised; a longitudinally movable bed; means for moving said bed rearwardly and forwardly; a lever adapted to be engaged by a part on the bed as soon as the latter reaches a predetermined position; and a link connecting said lever with the segment operating lever, substantially as described.

12. In a manure spreader the combination of a vertically movable tail board; mechanism driven from the ground wheel for raising the same and holding it as raised; a rotary beater; a driving shaft; driving connections between the shaft and the beater; a clutch in said connections; a rod adapted to control said clutch and pivotally connected to a controlling lever; a rod also pivoted on said lever, adapted when moved in one direction to condition the tail board mechanism to operate, and adapted when in its normal position to permit of the tail board being released and dropped; a spring tending to maintain the controlling lever in its normal position; a latch adapted to hold the lever and rods in the position they assume when the lever has been moved to cause the tail board to rise and the beater to operate; a finger adapted to release said latch; a longitudinally movable bed; means for moving said bed rearwardly and forwardly; and a part on said bed adapted to engage said finger at a predetermined time to release the latch and cause the rods and lever to assume their normal position, substantially as described.

13. In a manure spreader the combination of a vertically movable tail board; mechanism driven from the ground wheel for raising the same and holding it as raised; a rotary beater; a driving shaft; driving connections between the shaft and the beater; a clutch in said connections; a rod adapted to control said clutch and pivotally connected to a controlling lever; a rod also pivoted on said lever, adapted when moved in one direction to condition the tail board mechanism to operate, and adapted when in its normal position to permit of the tail board being released and dropped; a spring tending to maintain the controlling lever in its normal position; a latch adapted to hold the lever and rods in the position they assume when the lever has been moved to cause the tail board to rise and the beater to operate; a finger adapted to release said latch; a longitudinally movable bed; means for moving said bed rearwardly and forwardly; a part on said bed adapted to engage said finger at a predetermined time to release the latch and cause the rods and lever to assume their normal position; means for releasing the tail board when it is held raised; and a part on said bed adapted to operate said releasing means after the lever and rods have assumed their normal position, substantially as described.

14. In a manure spreader the combination of an endless movable bed; a rotary beater at one end of the spreader; a vertically movable tailboard in front of the spreader; a driving shaft; means for driving the bed from the shaft in either direction; means for driving the beater from the shaft; means driven by the shaft for raising the tail board; a single controlling lever adapted to simultaneously condition the bed driving means to drive the bed rearwardly, to condition the tailboard raising means to raise the tail board and to condition the beater driving means to operate; means for automatically conditioning the bed driving means to drive the bed forwardly after the bed has reached a predetermined rearward limit and for conditioning the beater driving means to stop; means for automatically conditioning the tail board operating means to lower the tail board subsequent to the cessation of the rearward movement of the bed; and means for automatically stopping the forward movement of the bed as soon as it returns to its normal position, substantially as described.

15. In a manure spreader the combination of a driving shaft; a movable bed; a shaft adapted to drive the same; a longitudinal shaft geared to the driving shaft; a direct gearing between the longitudinal and the bed shaft; reverse gearing between the two shafts; manually controlled means for putting the direct gearing into gear; means for automatically throwing it out of gear at a predetermined time and subsequently and automatically throwing the reverse gearing into gear; and automatic means for throwing the reverse gearing out of gear at a predetermined time, substantially as described.

16. In a manure spreader the combination of a driving shaft; a movable bed; a shaft adapted to drive the same; a longitudinal shaft geared to the driving shaft; a direct gearing between the longitudinal shaft and the bed shaft; reverse gearing between the two shafts; manually controlled means for putting the direct gearing into gear; means for automatically throwing it out of gear at a predetermined time and subsequently and automatically throwing the reverse gearing into gear; automatic means for throwing the reverse gearing out of gear at a predetermined time; and means preventing the direct gearing being put into gear while the reverse gearing is in gear, substantially as described.

17. In a manure spreader the combination of a driving shaft; a movable bed; a shaft adapted to drive the same; a worm wheel on the bed shaft; a longitudinal shaft geared to the driving shaft; a worm thereon adapted to engage the worm wheel on the bed shaft; means for throwing the worm and worm wheel into and out of gear; a bevel gear revolubly connected with the bed shaft; a frame journaled on the bed shaft; a shaft journaled thereon; a bevel pinion fast thereon meshing with the aforesaid bevel gear; a bevel gear fast at the other end thereof; a bevel gear fast on the longitudinal shaft; and means for rocking the frame to throw the bevel gear fast on the end of the shaft on the frame into and out of gear with the bevel gear on the longitudinal shaft, substantially as described.

18. In a manure spreader the combination of a driving shaft; a movable bed; a shaft adapted to drive the same; a worm wheel on the bed shaft; a longitudinal shaft geared to the driving shaft; a worm thereon adapted to engage the worm wheel on the bed shaft; a slide movable on the frame of the machine to and from the bed shaft and having the rear end of the longitudinal shaft loosely journaled thereon, the other end of the shaft being loosely journaled adjacent to the main shaft; a bevel gear revolubly connected with the bed shaft; a frame journaled on the bed shaft; a shaft journaled thereon; a bevel pinion fast thereon meshing with the aforesaid bevel gear; a bevel gear fast at the other end thereof; a bevel gear fast on the longitudinal shaft; and means for rocking the frame to throw the bevel gear fast on the end of the shaft on the frame into and out of gear with the bevel gear on the longitudinal shaft, substantially as described.

19. In a manure spreader the combination of a driving shaft; a movable bed; a shaft adapted to drive the same; a longitudinal shaft geared to the driving shaft; direct drive gearing between the longitudinal shaft and the bed shaft; reverse gearing between the two shafts; means for putting the direct drive into and out of gear; a sliding bolt adapted to put the reverse into and out of gear; yielding means tending to move the bolt to put the reverse in gear; automatic means adapted at a predetermined time to press the bolt into the position it assumes when the reverse is out of gear; a dog adapted to hold the bolt in the position it assumes when the reverse is out of gear; and means whereby when the direct drive is drawn out of gear the aforesaid dog is released and the bolt left free to move the reverse into gear substantially as described.

20. In a manure spreader the combination of a driving shaft; a movable bed; a shaft adapted to drive the same; a longitudinal shaft geared to the driving shaft; direct drive gearing between the longitudinal shaft and the bed shaft; reverse gearing between the two shafts; means for putting the direct drive into and out of gear; automatic means for throwing the reverse into gear; means tending when the reverse is in gear to throw it out of gear; a dog adapted to hold the reverse out of gear; and means whereby the act of throwing the direct drive out of gear releases the said dog substantially as described.

21. In a manure spreader the combination of a driving shaft; a movable bed; a shaft adapted to drive the same; a longitudinal shaft geared to the driving shaft; direct drive gearing between the longitudinal shaft and the bed shaft; reverse gearing between the two shafts; means for putting the direct drive into and out of gear; means for throwing the reverse into gear; means tending when the reverse is in gear to throw it out of gear; a dog adapted to hold the reverse out of gear; and means whereby the act of throwing the direct drive out of gear releases the said dog substantially as described.

22. In a manure spreader the combination of a driving shaft; a movable bed; a shaft adapted to drive the same; direct drive gearing between the two shafts; reverse gearing between the two shafts; means for putting the direct drive into and out of gear; a sliding bolt adapted to put the reverse into and out of gear; yielding means tending to move the bolt to put the reverse in gear; automatic means adapted at a predetermined time to press the bolt into the position it assumes when the reverse is out of gear; a dog adapted to hold the bolt in the position it assumes when the reverse is out of gear; and means whereby when the direct drive is drawn out of gear the aforesaid dog is released and the bolt left free to move the reverse into gear, substantially as described.

23. In a manure spreader the combination of a driving shaft; a movable bed; a shaft adapted to drive the same; direct drive gearing between the two shafts; reverse gearing between the two shafts; means for putting the direct drive into and out of gear; automatic means for throwing the reverse out of gear; means tending when the reverse is out of gear to throw it in gear; a dog adapted to hold the reverse out of gear, and means whereby the act of throwing the direct drive out of gear releases the said dog substantially as described.

24. In a manure spreader driving and reversing gear for the bed comprising the following elements a transmission shaft; a bed shaft; direct drive gearing between the two; reverse drive gearing between the two; means for putting the direct drive into and out of gear; a sliding bolt adapted to control the reverse; a spring normally tending to move the bolt to throw the reverse in gear; a dog adapted to engage the bolt to hold the reverse out of gear; means for creating a spring pressure on the bolt greater than and in an opposite direction to the first mentioned spring; and a dog adapted to engage the bolt to hold the reverse out of gear, substantially as described.

25. In a manure spreader driving and reversing gear for the bed comprising the following elements; a transmission shaft; a bed shaft; direct drive gearing between the two; reverse drive gearing between the two; means for putting the direct drive into and out of gear; a sliding bolt adapted to control the reverse; a spring normally tending to move the bolt to throw the reverse in gear; a dog adapted to engage the bolt to hold the reverse out of gear; a trip bar connected with the aforesaid means and adapted when the direct drive is thrown out of gear to engage and trip the aforesaid dog; means for creating a spring pressure on the bolt greater than and in an opposite direction to the first mentioned spring; and a dog adapted to engage the bolt to hold the reverse in gear, substantially as described.

26. In a manure spreader driving and reversing gear for the bed comprising the following elements: a transmission shaft; a bed shaft; direct drive gearing between the two; reverse drive gearing between the two; means for putting the direct drive into and out of gear; a sliding bolt adapted to control the reverse; a spring normally tending to move the bolt to throw the reverse in gear; a dog adapted to engage the bolt to hold the reverse out of gear; a trip bar connected with the aforesaid means and adapted when the direct drive is thrown out of gear to engage and trip the aforesaid dog; means for creating a spring pressure on the bolt greater than and in an opposite direction to the first mentioned spring; and a dog adapted to engage the bolt to hold the reverse in gear, the said means being adapted to release the said dog after the pressure of the first mentioned spring has been overcome, substantially as described.

27. In a manure spreader driving and reversing gear for the bed, comprising the following elements; a transmission shaft; a bed shaft; direct drive gearing between the two; reverse drive gearing between the two; means for putting the direct drive into and out of gear; a sliding bolt adapted to control the reverse; a spring normally tending to move the bolt to throw the reverse in gear; a dog adapted to engage the bolt to hold the reverse out of gear; a spring normally inactive and stronger than the first mentioned spring; a part movable to cause the spring to exert pressure on the bolt in the reverse direction to the first mentioned spring; a dog adapted to engage the bolt to hold the reverse in gear; and means whereby the said moving part is adapted to release the said dog after the tension of the first mentioned spring has been overcome, substantially as described.

28. In a manure spreader driving and reversing gear for the bed comprising the following elements; a transmission shaft; a bed shaft; direct drive gearing between the two; reverse drive gearing between the two; means for putting the direct drive into and out of gear; a sliding bolt adapted to control the reverse; a spring normally tending to move the bolt to throw the reverse in gear a dog adapted to engage the bolt to hold the reverse out of gear; a trip bar connected with the aforesaid means and adapted when the direct drive is thrown out of gear to engage and trip the aforesaid dog; a spring normally inactive and stronger than the first mentioned spring; a part movable to cause the spring to exert pressure on the bolt in the reverse direction to the first mentioned spring; a dog adapted to engage the bolt to hold the reverse in gear; and means whereby the said moving part is adapted to release the said dog after the tension of the first mentioned spring has been overcome, substantially as described.

29. In a manure spreader driving and reversing gear for the bed comprising the following elements; a transmission shaft; a bed shaft; direct drive gearing between the two; reverse drive gearing between the two; means for putting the direct drive into and out of gear; a sliding bolt adapted to control the reverse; a spring normally tending to move the bolt to throw the reverse in gear; a dog adapted to engage the bolt to hold the reverse out of gear; a trip bar connected with the aforesaid means, and adapted when the direct drive is thrown out of gear to engage and trip the aforesaid dog; means for creating a spring pressure on the bolt greater than and in an opposite direction to the first mentioned spring; a dog adapted to engage the bolt to hold the reverse in gear; a pivoted arm adapted to engage the trip bar to move it to an inoperative position; and a toe on the bolt adapted when the bolt is moved to the position in which the reverse is in gear to engage the pivoted arm to throw the trip bar to the inoperative position, substantially as described.

30. In a manure spreader driving and reversing gear for the bed comprising the following elements; a transmission shaft; a bed shaft; direct drive gearing between the two; reverse drive gearing between the two; means for putting the direct drive into and out of gear; a sliding bolt adapted to control the reverse, a spring normally tending to move the bolt to throw the reverse in gear; a dog adapted to engage the bolt to hold the reverse out of gear; a trip bar connected with the aforesaid means and adapted when the direct drive is thrown out of gear to engage and trip the aforesaid dog; a spring normally inactive and stronger than the first mentioned spring; a part movable to cause the spring to exert pressure on the bolt in the reverse direction to the first mentioned spring; a pivoted arm adapted to engage the trip bar to move it to an inoperative position; a dog adapted to engage the bolt to hold the reverse in gear; and means whereby the said moving part is adapted to release the said dog after the tension of the first mentioned spring has been overcome, the movable part being adapted to engage the pivoted arm to hold the trip bar in its inoperative position while the bolt is moving to the "direct drive" position, substantially as described.

Toronto, Ont., 20th September, 1906.

ANDREW JOHNSTON.

Signed in the presence of—,
  L. A. McTAGGART,
  JOHN F. ORR.